OR    4,124,275

United States
Uesugi

B   4,124,275
Nov. 7, 1978

[54] COMPACT VARIFOCAL LENS ASSEMBLY

[75] Inventor: Kyozo Uesugi, Osaka, Japan

[73] Assignee: Minolta Camera Kabushiki Kaisha, Osaka-fu, Japan

[21] Appl. No.: 315,828

[22] Filed: Dec. 18, 1972

[44] Published under Trial Voluntary Protest Program on Jan. 28, 1975 as document No. B 315,828.

[30] Foreign Application Priority Data

Dec. 31, 1971 [JA]   Japan ........................... 47-2419

[51] Int. Cl. ................................. G02B 7/10
[52] U.S. Cl. ................................. 350/187
[58] Field of Search ...................... 350/187, 186

[56] References Cited
U.S. PATENT DOCUMENTS 3,465,662   9/1969   Kashiwase ................. 350/187 X
3,765,748   10/1973   Mito ......................... 350/187

FOREIGN PATENT DOCUMENTS 46-33495   10/1971   Japan ....................... 350/187

*Primary Examiner*—John K. Corbin
*Attorney, Agent, or Firm*—E. F. Wenderoth

[57] ABSTRACT

A verifocal lens assembly of simplified construction includes a lens mounting for focusing adjustment, a second lens mounting, a third lens mounting cooperative with the second lens mounting for adjustment of the focal length and for correction of optical aberrations resulting from the displacement of the second lens mounting, and an operating barrel for operating the first and second lens mountings, either independently or simultaneously. The operating barrel effects, when rotated, the focusing operation and, when axially moved, the zooming operation.

14 Claims, 8 Drawing Figures

COMPACT VARIFOCAL LENS ASSEMBLY

BACKGROUND OF THE INVENTION

The present invention relates to a varifocal lens for use in photographic, motion picture and television cameras and, more particularly, to a zooming and focus control in the varifocal lens by which zooming and focusing operations are carried out either independently or simultaneously.

It is well known that one type of varifocal lens, for example, for use in a photographic camera generally comprises a group of focusing lenses, a first group of zooming lenses, a second group of zooming lenses and a group of fixed lenses, all being mounted in a specific arrangement in the lens barrel rigidly or interchangeably secured to the body of the photographic camera. In this varifocal lens, the zooming operation for varying the image size in the field of view of the photographic camera is carried out by moving the first zooming lens group in a direction parallel to the longitudinal axis of the lens barrel or the optical axis common to these groups of lenses. The second zooming lens group is operatively associated with the first zooming lens group for permitting the picture image appearing in the field of view of an observer or photographer to remain in focus at all times during the axial movement of the first zooming lens group.

The focusing operation has a purpose entirely different from that of the zooming operation and is carried out by moving the focusing lens group in a direction parallel to the common optical axis so that an image of an object to be photographed can sharply appear in the field of view of the photographer.

The present invention pertains to varifocal lens of the type having a single actuating member movably carried by the lens barrel and accessible to the photographer, the axial movement or sliding of which results in the zooming operation in such a way as to vary the focal length of the optical system of the photographic camera, while the rotary movement of the single actuating member about the common optical axis results in the focusing operation in such a way as to adjust the focusing lens group to give a sharp image of an object to be photographed in the field of view of a photographer.

A varifocal lens of the above mentioned type, which is heretofore largely employed, is generally complicated and expensive with the lens barrel being composed of a number of separate lens mounts. Usually, the lens mounts for the focusing lens group and the first and second zooming lens groups are mechanically coupled to one another such as by means of key-and-groove engagement, which are in turn mechanically coupled to the single actuating member by means of a similar engagement. Once such mechanical engagements lose precision, an undesirable wobbling or swaying will occur among these lens mounts. In other words, the greater the number of the lens mounts, the more the errors which are accumulated during assembly of the varifocal lens, and this fact, therefore, leads to reduction of the resolution of the lens.

For better understanding of the present invention, one type of prior art varifocal lens wherein the single actuating member for focal distance and focal length adjustments is provided will be hereinafter described with reference to FIGS. 1 and 2 of the accompanying drawings, wherein FIG. 1 is a schematic longitudinal sectional view of the prior art varifocal lens, and FIG. 2 is a schematic top plan view of an essential portion thereof.

Referring to FIGS. 1 and 2, the focusing lens group, the first and second zooming lens groups and the fixed lens group are schematically represented by a single lens and respectively indicated by F, $z_1$ and $z_2$ and K. Assuming that the body of a photographic camera to which the varifocal lens shown is interchangeably mounted is located to the right of FIG. 1 though not shown therein, these lens groups F, $Z_1$, $Z_2$ and K are arranged in the order given above and have a common optical axis such as indicated by X. The prior art varifocal lens comprises a stationary barrel 1 having a rear end portion adapted to be inserted in the body of the camera in any known manner and an opposite front end portion threaded as at 1a. A lens mount 2 for the focusing lens group F is formed at the front thereof integrally with a sleeve 3 which extends in the interior of the lens mount 2 in equidistantly spaced relation to lens mount 2 and terminates at a threaded portion 3a, the sleeve 3 rigidly carrying the focusing lens group F at one end portion adjacent to the front thereof. This lens mount 2 is relatively rotatably carried by the stationary barrel 1 with the threaded portion 3a threadably engaged with the threaded portion 1a. An actuating member or operating barrel 4 is rotatably and axially movably mounted on the stationary barrel 1 and is rigidly provided with at least one radially inwardly extending pin 4a which is slidably engaged in a straight groove or slot 2a extending in parallel relation to the common optical axis X and formed in the lens mount 2 at an end portion adjacent to the rear end thereof.

The varifocal lens shown further comprises a lens mount 5 for the first zooming lens group $Z_1$ which is rigidly carried thereby at the front thereof, the lens mount 5 being axially slidably housed within the stationary barrel 1 and mounted on a stationary collar 6 having a rear end rigidly connected with the stationary barrel 1. The lens mount 5 is axially movable together with the operating barrel 4 and, for this purpose, a suitable linkage 7 is provided therebetween. This linkage 7 extends through a cam slot 1b formed in the stationary barrel 1 at a substantially intermediate portion thereof and includes a suitable bearing member 7a designed such as to permit the axial movement of the operating barrel 4 to be transmitted to the lens mount 5, but to restrain the rotation of barrel 4 from being transmitted to lens mount 5. In practice, operative coupling between the operating barrel 4 and the lens mount 5 is achieved by the provision of ball elements or rollers accommodated in opposed and circumferentially extending grooves respectively formed on the inner peripheral surface of the operating barrel 4 and the outer peripheral surface of the lens mount 5 with the ball elements or rollers extending through the cam slot 1b in the stationary barrel 1.

A lens mount 8 for the second zooming lens group $Z_2$ is carried thereby at the front thereof is axially movably mounted within a sleeve 8 which is in turn rotatably mounted within the stationary collar 6. As shown in FIG. 2, this lens mount 8 is provided with at least one pin 8a extending radially outwardly therefrom through a helically extending cam slot 9a, formed in the sleeve 9, and terminating in an axially straight groove or slot 6a formed in the stationary collar 6, whereby movement of sleeve 9, which is caused in a manner as will be described later, is transmitted to the lens mount 8.

The sleeve 9 is provided with at least one pin 9b extending radially outwardly therefrom through a circumferentially extending slot 6b in the stationary collar 6 and terminating in a cam slot 5a formed in the lens mount 5 at a substantially intermediate portion thereof, said cam slot 5a having a particular configuration so designed that the axial movement of the lens mount 5 in either of the opposite directions accompanied by the corresponding movement of the operating barrel 4 results in a reciprocative rotary motion of the sleeve 9 in the opposite direction about the common optical axis X.

Now that it has become clear that the sleeve 9 reciprocally moves in the axial direction while rotating about the common optical axis X in response to the movement of the operating barrel in either of the opposite axial directions, the lens mount 8 correspondingly reciprocates in the axial direction without rotating.

The mode of relative movement of the first and second zooming lens groups $Z_1$ and $Z_2$ has a functional relationship, as is well understood by those skilled in the art, to correct optical aberrations of the optical system of the varifocal lens through all the zoom positions and, therefore, the details thereof are herein omitted.

In any event, in the varifocal lens of the above construction, it is clear that the rotary movement of the operating barrel 4 results in corresponding rotation of the lens mount 2 and hence the sleeve 3, thereby to effect the focusing of the varifocal lens, while axial sliding of the operating barrel 4 results in corresponding axial movement of the lens mount 5 and the axial reciprocal movement of the lens mount 8, thereby to effect the zooming of the varifocal lens.

From the foregoing, it will be clear that the prior art varifocal lens is relatively complicated and does not have a convenient size relationship with respect to the body of the camera to which it is mounted. In addition, convenient and quick adjustment of the zooming and focusing of the lens is hampered due to a number of interconnections among the various lens mounts and barrels employed.

SUMMARY OF THE INVENTION

Accordingly, an essential object of the present invention is to provide a varifocal lens for use in photographic, motion picture and television cameras, which is relatively compact in overall size and which can be easily manufactured at lower costs than required in the manufacture of the prior art varifocal lens of a similar type, with substantial elimination of the disadvantages inherent in the prior art.

Another object of the present invention is to provide a varifocal lens of the above type which will be easier to operate than similar type prior art varifocal lens.

A further object of the present invention is to provide a varifocal lens of the above type wherein adjustments of the optical system of the lens to different focal distances and different focal lengths are performed by a single actuating member or operating barrel which is movable, either independently or simultaneously, in the axial and circumferential directions with respect to the optical axis of the varifocal lens.

BRIEF DESCRIPTION OF THE DRAWINGS

These and other objects and features of the present invention will become apparent from the following description taken in conjunction with preferred embodiments with reference to the accompanying drawings and in which.

As noted hereinabove.

DETAILED DESCRIPTION OF THE INVENTION

Figure 1:
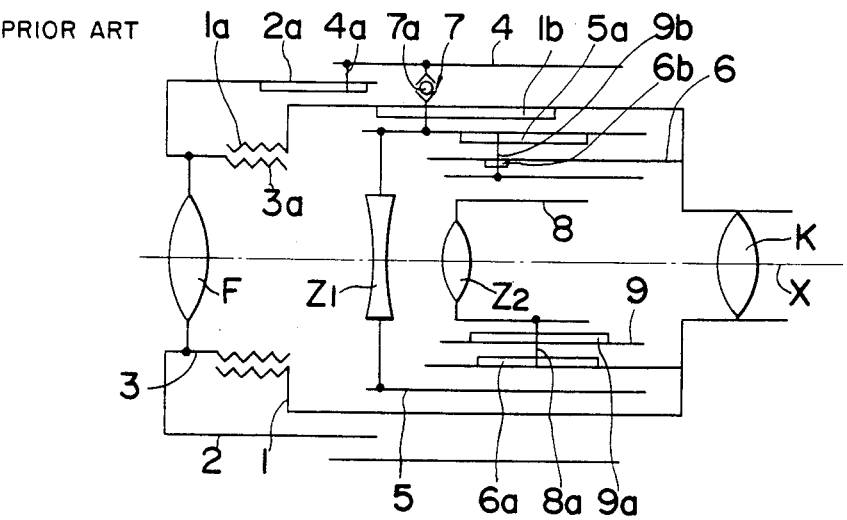
FIG. 1 is a schematic longitudinal sectional view of the prior art varifocal lense.
Figure 2:
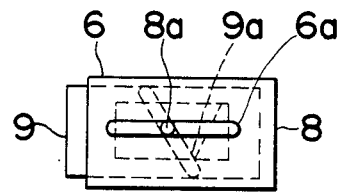
FIG. 2 is a schematic top plan view of a portion of FIG. 1.

Before the description of the present invention proceeds, it is to be noted that, for the sake of brevity, the reference numerals employed in the description of the prior art varifocal lens with reference to FIGS. 1 and 2 are employed in the following description as well to designate like parts.

Figure 3:
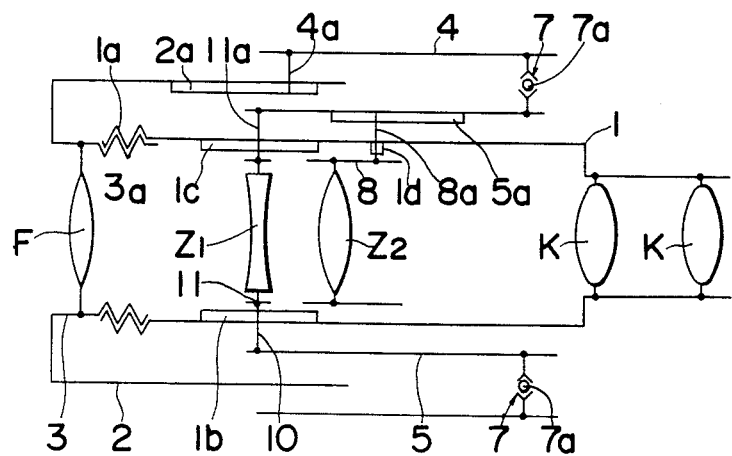
FIG. 3 is a schematic longitudinal sectional view of one embodiment of the present invention, showing the principle of arrangement of the varifocal lens.
Figure 4:
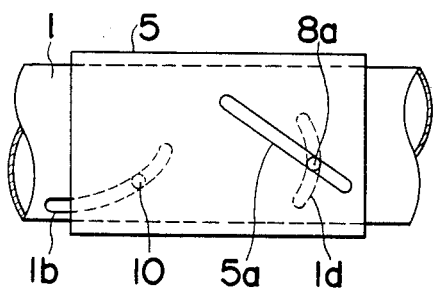
FIG. 4 is a schematic diagram showing the arrangement of various cam slots or grooves employed in the arrangement of FIG. 3.

Referring now to FIGS. 3 and 4, it is clear that the stationary collar 6 and the sleeve 9 and their associated parts employed in the prior art varifocal lens shown in FIG. 1 are not necessitated in the varifocal lens shown in FIG. 3. However, in the arrangement shown in FIG. 3, the lens mount 5 for the first zooming lens group $Z_1$ is designed to axially move while rotating a predetermined angle about the common optical axis X in response to the axial sliding movement of the operating barrel 4. For this purpose, the cam slot 1b formed in the stationary barrel 1 is shaped such as shown in FIG. 4 extend in a substantially helically curved manner, while a pin 10 connecting between the lens mount 5 and a lens support 11 as will be mentioned later slidably extends through cam slot 1b of the configuration as will be described later. The lens support 11 is used to hold the first zooming lens group $Z_1$ in position and has a radially outwardly extending lug 11a suitably connected to the lens mount 5, a substantially intermediate portion of said lug 11a extending loosely through a substantially rectangular opening 1c which is formed in the stationary barrel 1. The opening 1c is, it is to be noted, so sized that the peripheral edges defining opening 1c in stationary barrel 1 do not obstruct movement of the lens mount 5 and the lens support 11 connected with lens mount 5 by lug 11a.

The cam slot 1b in the stationary barrel 1 is, in this embodiment of FIG. 3, of such a particular configuration as shown in FIG. 4 and is so shaped that the axial movement of the operating barrel 4 causes the lens mount 5 to undergo a helical rotation, i.e., to rotate about the optical axis X while simultaneously axially moving in the same direction as the operating barrel 4, with the pin 10 slidably guided along cam slot 1b. In view of this, it may be said that the lens mount 5 in FIG. 3 concurrently performs the two roles of the lens mount 5 and the sleeve 9; both employed in FIG. 1.

The helical rotation of the lens mount 5 for the first zooming lens group $Z_1$ supported thereby through the lens support 11 is transmitted to the lens mount 8 for the second zooming lens group $Z_2$ through the pin 8a extending through a slot 1d, formed in the stationary barrel 1, and slidably engaged in the groove 5a in the lens mount 5. The groove 1d and the slot 5a are of such configurations as shown in FIG. 4 and are so shaped that the helical rotation of the lens mount 5 causes the lens mount 8 to reciprocate in substantially the same manner as afforded by the lens mount 8 employed in FIG. 1.

Figure 5:
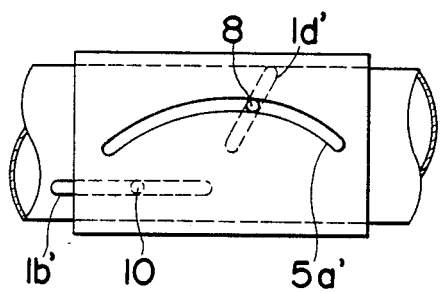
FIG. 5 is a schematic diagram showing a modification of FIG. 4.

The following alternative is also possible. Provided that the cam slot 1b of FIG. 4 is made straight as shown by 1b' in FIG. 5 so that the axial movement of the operating barrel 4 results in the corresponding axial movement of the lens mount 5 without rotating the latter, or provided that, without the employment of the cam slot 1b and the cooperating pin 10, the opening 1c is so shaped as to permit the lens mount 5 to move only in the axial direction in accordance with the movement of the operating barrel 4, the groove 1d and the slot 5a may be shaped as shown by 1d' and 5a' in FIG. 5, respectively. Even in this alternative arrangement, the reciprocative movement of the second zooming lens group $Z_2$ relative to the axial movement of the lens mount 5 can be achieved without any reduction of performance.

Figure 6:
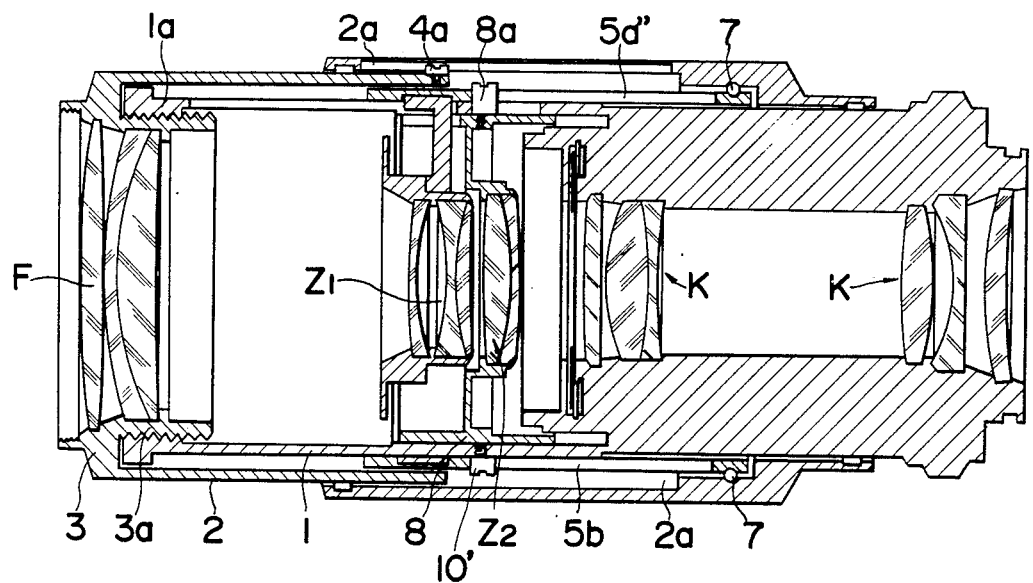
FIG. 6 is a longitudinal sectional view of the varifocal lens in practice constructed in accordance with another embodiment of the present invention.
Figure 7:
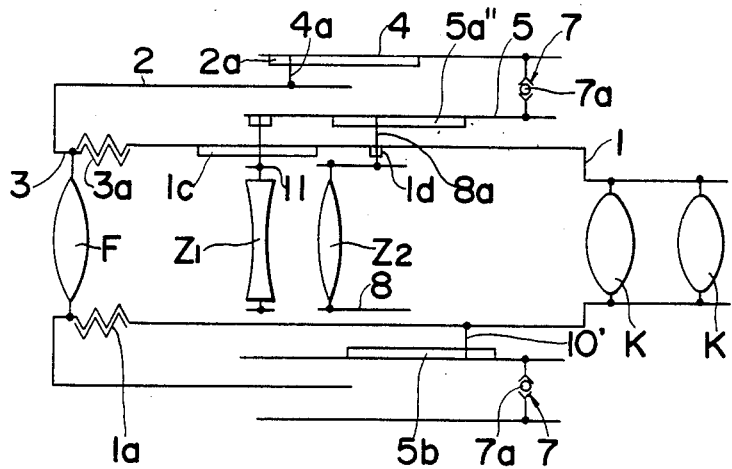
FIG. 7 is a schematic longitudinal sectional view showing the principle or arrangement of the embodiment of FIG. 6.
Figure 8:
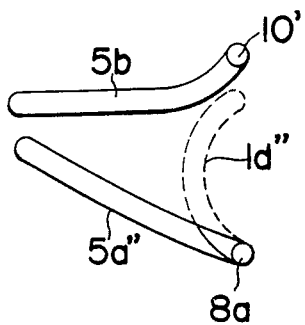
FIG. 8 is a schematic diagram showing the arrangement of various cam slots or grooves employed in the arrangement of FIG. 6.

Referring now to FIG. 6 to FIG. 8 in which the other preferred embodiment of the present invention is shown, there can be found two differences between the embodiments of FIGS. 3 and 4 and of FIGS. 6 to 8. One such difference is that the groove 2a and the pin 4a, which have been described as provided in the lens mount 2 and the operating barrel 4 in the foregoing embodiment, are respectively provided in the operating barrel 4 and the lens mount 2. The other difference is that a cam groove 5b of the shape as shown in FIG. 8, which corresponds to the cam slot 1b in the foregoing embodiment, is formed in the lens mount 5 while a pin 10' corresponding to the pin 10 of FIG. 3 is provided as extending from the stationary barrel 1 and terminating in the cam groove 5b. It is to be noted that the cam slot 1b and the pin 10 employed in the foregoing embodiment are omitted in this embodiment. While the cam groove 5b has a substantially similar configuration to that of the cam slot 1b shown in FIG. 4, the cam groove 5a and the slot 1d of FIG. 3 respectively shaped as shown by 5a" and 1d" in FIG. 8. In any event, the arrangement of the various guides shown in FIG. 4 and that shown in FIG. 8 are convertible with respect to each other. In order words, the arrangement of FIG. 4 and that of FIG. 8 may be applicable to the varifocal lens shown in FIG. 7 and that shown in FIG. 3, respectively, without any reduction of performance of the varifocal lens constructed in accordance with the teachings of the present invention. Of course, the varifocal lens according to the embodiment of FIGS. 6 to 8 functions substantially in the same manner as the varifocal lens according to the first mentioned embodiment of FIGS. 3 and 4 or 5.

From the foregoing full description of the present invention, it has now become clear that the varifocal lens according to the present invention is compact in size with a reduced number of parts compared with the prior art varifocal lens of similar type.

It is to be noted that, from the foregoing description and/or the accompanying drawings, various changes and modifications are apparent to those skilled in the art. By way of example, although the lens mount 5 for the first zooming lens group $Z_1$ has been described as movably mounted on the stationary barrel 1 in any of the preferred embodiments, it may be operatively housed within the stationary barrel 1. The same may be applicable to the other lens mounts and, therefore, the order or arrangement of the various mountings should be understood as not being limited to the preferred embodiments.

Accordingly, such changes and modifications should be understood as included within the spirit and scope of the present invention unless they otherwise depart therefrom.

What is claimed is:

1. A varifocal lens assembly of the type wherein zoom is controlled by one movement, preferably axial, and focus is controlled by another movement, preferably rotation, for use in association with photographic, motion picture and television cameras, said assembly comprising:

an objective mounting;

first means for movement in the axial direction in relation to said objective mounting for achieving focusing adjustment, said first means comprising a first mounting rotatably carried by said objective mounting;

second means for achieving adjustment of the focal length, said second means comprising a second mounting mounted on said objective mounting and axially movable in relation thereof, a lens mount movably housed within said objective mounting, an opening formed in said objective mounting, and a connecting member extending through said opening and rigidly connecting said lens mount to said second mounting;

third means for permitting the picture image appearing in the field of view of an observer or photographer to remain in focus at all times during axial movement of said second mounting, said third means comprising a third mounting operatively positioned axially of and movable in relation to said second mounting;

an actuating member mounted on said objective mounting and accessible to the photographer or operator of the assembly for independent or simultaneous rotary and axial movement relative to said objective mounting;

first guide means, connected between said actuating member and said first mounting, for transmitting rotary movement of said actuating member to said first mounting, thereby rotating said first mounting and causing axial displacement of said first means with respect to said objective mounting;

linkage means, connected between said second mounting and said actuating member, for transmitting movement to said second mounting in response to axial movement only of said actuating member; and second guide means, connected between said second mounting and said third mounting, for transmitting movement of said second mounting to said third mounting and for thereby permitting relative movement of said third mounting with respect to said second mounting.

2. A varifocal lens assembly as claimed in claim 1, wherein said first guide means comprises at least one guide way formed in one of said first mounting and said actuating member, and a guide pin rigidly provided in the other of said first mounting and said actuating member and slidably engaged in said guide way, said guide way extending in a direction parallel to the longitudinal axis of the varifocal lens assembly, and said first mounting being threadably carried by said objective mounting at the front thereof.

3. A varifocal lens assembly as claimed in claim 1, further comprising third guide means for rotating said second mounting during the axial movement of said second mounting responsive to the axial movement of said actuating member.

4. A varifocal lens assembly as claimed in claim 3, wherein said third guide means comprises at least one guide way formed in one of said second mounting and said objective mounting and a guide pin rigidly provided in the other of said second mounting and said objective mounting.

5. A varifocal lens assembly as claimed in claim 1, wherein said first mounting is adapted to carry a focusing lens group, said second mounting is adapted to carry a first zoom lens group, and said third mounting is adapted to carry a second zoom lens group.

6. A varifocal lens assembly of the type wherein zoom is controlled by one movement, preferably axial, and focus is controlled by another movement, preferably rotation, for use in association with photographic, motion picture and television cameras, said assembly comprising:

an objective mounting;

first means for movement in the axial direction in relation to said objective mounting for achieving focusing adjustment, said first means comprising a first mounting rotatably carried by said objective mounting;

second means for achieving adjustment of the focal length, said second means comprising a second mounting operatively positioned to be axially movable in relation to said objective mounting;

third means for permitting the picture image appearing in the field of view of an observer or photographer to remain in focus at all times during axial movement of said second mounting, said third means comprising a third mounting mounted within said objective mounting at a position axially of and movable in relation to said second mounting;

an actuating member mounted on said objective mounting and accessible to the photographer or operator of the assembly for independent or simultaneous rotary and axial movement relative to said objective mounting;

first guide means, connected between said actuating member and said first mounting, for transmitting rotary movement of said actuating member to said first mounting, thereby rotating said first mounting and causing axial displacement of said first means with respect to said objective mounting;

linkage means, connected between said second mounting and said actuating member, for transmitting movement to said second mounting in response to axial movement only of said actuating member; and second guide means, connected between said second mounting and said third mounting, for transmitting movement of said second mounting to said third mounting and for thereby permitting relative movement of said third mounting with respect to said second mounting, said second guide means comprising at least one guide way formed in one of said third mounting and said second mounting, and a guide pin rigidly provided in the other of said second mounting and said third mounting and slidably engaged in said first guide way, and a cam slot formed in said objective mounting, a substantially intermediate portion of said guide pin slidably extending through said cam slot.

7. A varifocal lens assembly as claimed in claim 6, wherein said first guide means comprises a further guide way formed in one of said first mounting and said actuating member, and a further guide pin rigidly provided in the other of said first mounting and said actuating member and slidably engaged in said further guide way, said guide way extending in a direction parallel to the longitudinal axis of the varifocal lens assembly, and said first mounting being threadably carried by said objective mounting at the front thereof.

8. A varifocal lens assembly as claimed in claim 6, further comprising third guide means for rotating said second mounting during the axial movement of said second mounting responsive to the axial movement of said actuating member.

9. A varifocal lens assembly as claimed in claim 8, wherein said third guide means comprises a further guide way formed in one of said second mounting and said objective mounting, and a further guide pin rigidly provided in the other of said second mounting and said objecting mounting.

10. A varifocal lens assembly as claimed in claim 6, wherein said first mounting is adapted to carry a focusing lens group, said second mounting is adapted to carry a first zoom lens group, and said third mounting is adapted to carry a second zoom lens group.

11. A varifocal lens assembly as claimed in claim 6, wherein at least a portion of said guide way extends in a direction which is non-parallel to the longitudinal axis of the varifocal lens assembly.

12. A varifocal lens assembly as claimed in claim 11, further comprising means for restricting rotary movement of said second mounting relative to said objective mounting.

13. A varifocal lens assembly as claimed in claim 12, wherein said restricting means comprises a further guide way formed in one of said second mounting and said objective mounting and a further guide pin rigidly provided in the other of said second mounting and said objective mounting.

14. A varifocal lens assembly for use in association with photographic, motion picture and television cameras, said assembly comprising:

an objective mounting having therein a cam slot;

a group of focusing lenses;

a first mounting firmly carrying said focusing lens group and rotatably carried by said objective mounting for rotary motion in the axial direction in relation to said objective mounting for focusing adjustment;

a first group of zooming lenses;

a second mounting including a lens support firmly carrying said first zooming lens group within said objective mounting, said second mounting being mounted on said objective mounting for axial movement in relation to said objective mounting for adjustment of the focal length;

a second group of zooming lenses;

a third mounting firmly carrying said second zooming lens group and axially reciprocally mounted within said objective mounting in cooperative relation to said second mounting for permitting the picture image appearing in the field of view of an observer or photographer to remain in focus at all times during the axial movement of said second mounting;

an actuating member mounted on said objective mounting and accessible to the photographer or operator of the varifocal lens assembly for independent or simultaneous rotary and axial movement thereof;

first guide means connected between said actuating member and said first mounting for permitting the latter to undergo said rotary motion in the axial direction in accordance with rotary motion of said actuating member, said first guide means including a first guide way formed in one of said first mounting and said actuating member and a first guide pin rigidly provided in the other of said first mounting and said actuating member and slidably engaged in said first guide way, said first guide way extending in a direction parallel to the longitudinal axis of the varifocal lens assembly;

linkage means connected between said actuating member and said second mounting for transmitting movement to said second mounting in response to axial movement only of said actuating member, said linkage means including at least one pair of circumferentially extending grooves facing each other and formed in said actuating member and in said second mounting, and a plurality of bearing elements operatively housed within said pair of circumferentially extending grooves in substantially equidistantly spaced relation to each other for facilitating relative rotary motion only between said actuating member and said second mounting;

second guide means connected between said second mounting and said third mounting for transmitting movement of said second mounting to said third mounting and for thereby causing said third mounting to undergo reciprocal movement in relation to said second mounting, said second guide means including a second guide way formed in one of said third mounting and said second mounting and a second guide pin rigidly provided in the other of said second mounting and said third mounting, a substantially intermediate portion of said second guide pin slidably extending through said cam slot formed in said objective mounting; and third guide means operatively positioned for rotating said second mounting during axial sliding movement of said second mounting in response to axial movement of said actuating member, said third guide means including a third guide way formed in one of said second mounting and said objective mounting and a third guide pin rigidly provided in the other of said second mounting and said objective mounting.

* * * * *